(12) United States Patent
Huang

(10) Patent No.: US 9,725,336 B2
(45) Date of Patent: Aug. 8, 2017

(54) OIL-WATER SEPARATION POROUS STRUCTURE, METHOD FOR MANUFACTURING THEREOF AND DEVICE CONTAINING THEREOF

(71) Applicant: National Central University, Taoyuan (TW)

(72) Inventor: Chun-Jen Huang, Changhua County (TW)

(73) Assignee: National Central University, Taoyuan (TW)

( * ) Notice: Subject to any disclaimer, the term of this patent is extended or adjusted under 35 U.S.C. 154(b) by 322 days.

(21) Appl. No.: 14/636,195

(22) Filed: Mar. 3, 2015

(65) Prior Publication Data
US 2016/0194218 A1    Jul. 7, 2016

(30) Foreign Application Priority Data
Jan. 5, 2015    (TW) .............................. 104100103 A

(51) Int. Cl.
*B01D 24/00*      (2006.01)
*B01D 39/00*      (2006.01)
(Continued)

(52) U.S. Cl.
CPC .......... *C02F 1/288* (2013.01); *B01D 17/0202* (2013.01); *C02F 1/281* (2013.01);
(Continued)

(58) Field of Classification Search
CPC ........ C02F 2101/32; C02F 1/40; B01D 17/12; B01D 17/0214; B01D 2325/38
(Continued)

(56) References Cited

U.S. PATENT DOCUMENTS

| | | | |
|---|---|---|---|
| 5,936,703 A | * | 8/1999 | Miyazaki ................ C03C 17/30 |
| | | | 106/287.11 |
| 8,623,843 B2 | | 1/2014 | Chen et al. |

(Continued)

FOREIGN PATENT DOCUMENTS

| | | |
|---|---|---|
| CN | 201078100 Y | 6/2008 |
| CN | 103893999 A | 7/2014 |

(Continued)

OTHER PUBLICATIONS

Shiou-Bang Yeh et al., "Modification of Silicone Elastomer with Zwitterionic Silane for Durable Antifouling Properties," Langmuir, 2014, 30(38), pp. 11386-11393, American Chemical Society Publications.

(Continued)

*Primary Examiner* — Ana Fortuna
(74) *Attorney, Agent, or Firm* — CKC & Partners Co., Ltd.

(57) ABSTRACT

The present disclosure provides an oil-water separation porous structure including a substrate and an oil-water separation material layer. The substrate has a plurality of pores. The oil-water separation material layer is disposed on a surface of the substrate, which includes a zwitterionic molecule including an organosilane group and a zwitterionic group. A method for manufacturing the oil-water separation porous structure and an oil-water separation device having the oil-water separation porous structure are also disclosed herein.

21 Claims, 11 Drawing Sheets

(51) Int. Cl.
  B01D 63/00 (2006.01)
  B01D 29/00 (2006.01)
  C02F 1/40 (2006.01)
  B05D 5/00 (2006.01)
  C02F 1/28 (2006.01)
  B01D 17/02 (2006.01)
  C02F 101/32 (2006.01)
(52) U.S. Cl.
  CPC ............... C02F 1/285 (2013.01); C02F 1/40 (2013.01); C02F 2101/32 (2013.01)
(58) Field of Classification Search
  USPC .............................. 210/500.1, 767, 490, 776
  See application file for complete search history.

(56) References Cited

U.S. PATENT DOCUMENTS

| | | | |
|---|---|---|---|
| 8,728,529 B2 | 5/2014 | Butts et al. | |
| 2009/0202816 A1 | 8/2009 | Schlenoff | |
| 2012/0273000 A1* | 11/2012 | Jing | C09D 1/00 134/4 |
| 2013/0324700 A1 | 12/2013 | Liang et al. | |
| 2014/0060583 A1 | 3/2014 | Riddle et al. | |
| 2014/0209534 A1 | 7/2014 | Liu et al. | |
| 2016/0194218 A1* | 7/2016 | Huang | C02F 1/288 210/435 |

FOREIGN PATENT DOCUMENTS

| | | | |
|---|---|---|---|
| TW | 201040254 A | | 11/2010 |
| TW | 201348436 A | | 12/2013 |
| WO | WO 2015/143262 | * | 9/2015 |

OTHER PUBLICATIONS

Peng-Cheng Chen et al. "Mineral-Coated Polymer Membranes with Superhydrophilicity and Underwater Superoleophobicity for Effective Oil/Water Separation", published Sep. 27, 2013; Scientific Reports | 3 : 2776 | DOI: 10.1038/srep02776.

Lianbin Zhang et al. "A self-cleaning underwater superoleophobic mesh for oil-water separation", published Jul. 31, 2013; Scientific Reports | 3 : 2326 | DOI: 10.1038/srep02326.

Zhongxin Xue et al. "Special wettable materials for oil/water separation", The Royal Society of Chemistry 2014, J. Mater. Chem. A, Published on Oct. 1, 2013; 2014, 2, 2445-2460.

Jincui Gu et al. "Robust preparation of superhydrophobic polymer/ carbon nanotube hybrid membranes for highly effective removal of oils and separation of waterin-oil emulsions", The Royal Society of Chemistry 2014, Published on Jul. 7, 2014.

Yuzhang Zhu et al. "A novel zwitterionic polyelectrolyte grafted PVDF membrane for thoroughly separating oil from water with ultrahigh efficiency", The Royal Society of Chemistry 2013, Published on Mar. 6, 2013; J. Mater. Chem. A, 2013, 1, 5758-5765.

Chee Huei Lee et al. "The performance of superhydrophobic and superoleophilic carbon nanotube meshes in water-oil filtration", Elsevier, Science Direct, CARBON49 (2011) 669-676.

Fu Zhang et al. "Surface modification of stainless steel by grafting of polyethylene glycol) for reduction in protein adsorption", Elsevier, Biomaterials 22 (2001) 1541-1548.

Zhongxin Xue et al. "A Novel Superhydrophilic and Underwater Superoleophobic Hydrogel-Coated Mesh for Oil/Water Separation", 2011 Wiley-VCH Verlag GmbH & Co. KGaA, Weinheim, Adv. Mater. 2011, 23, 4270-4273.

Feng Zhang et al. "Nanowire-Haired Inorganic Membranes with Superhydrophilicity and Underwater Ultralow Adhesive Superoleophobicity for High-Efficiency Oil/Water Separation", 2013 Wiley-VCH Verlag GmbH & Co. KGaA, Weinheim, Adv. Mater. 2013, 25, 4192-4198.

Shiyan Zhang et al. "Bio-Inspired Anti-Oil-Fouling Chitosan-Coated Mesh for Oil/Water Separation Suitable for Broad pH Range and Hyper-Saline Environments", dx.doi.org/10.1021/am403203q | ACS Appl. Mater, 2013.

Shou Jian Gao et al. "Photoinduced Superwetting Single-Walled Carbon Nanotube/TiO2 Ultrathin Network Films for Ultrafast Separation of Oil-in-Water Emulsions", Article, vol. 8, No. 6, 6344-6352, 2014.

P. S. Brown et al. "Ultrafast Oleophobic-Hydrophilic Switching Surfaces for Antifogging, Self-Cleaning, and Oil-Water Separation", dx.doi.org/10.1021/am500882y | ACS Appl. Mater, 2014.

Qingsheng Liu et al. "Superhydrophilic and Underwater Superoleophobic Poly(sulfobetaine methacrylate)-Grafted Glass Fiber Filters for Oil-Water Separation", dx.doi.org/10.1021/am502302g | ACS Appl. Mater, 2014.

Na Liu et al. "A Facile Solvent-Manipulated Mesh for Reversible Oil/Water Separation", dx.doi.org/10.1021/am502809h | ACS Appl. Mater, 2014.

* cited by examiner

OIL-WATER SEPARATION POROUS STRUCTURE, METHOD FOR MANUFACTURING THEREOF AND DEVICE CONTAINING THEREOF

BACKGROUND

This application claims priority to Taiwanese Application Serial Number 104100103, filed Jan. 5, 2015, which is incorporated herein by reference.

FIELD OF INVENTION

The present disclosure relates to an oil-water separation porous structure. More particularly, the present disclosure relates to an oil-water separation porous structure having zwitterionic groups, a method for manufacturing thereof and a device containing thereof.

DESCRIPTION OF RELATED ART

Oily water, producing from industries such as metallurgy, food and leather, has been major pollutant to the ecological environment for a long time. In addition, because of an increasing numbers of oil spill accidents and wide acceptance of the new mining technique by hydraulic fracking, the oil-water separation has become a serious environment and economic issue.

Conventional approaches such as gravity separation, centrifugation, electric field, coagulation, and absorbance have been widely employed in industries for water treatment. However, these techniques remain the low separation efficiency, the generation of secondary pollutants and low cost effectiveness. Accordingly, there is a need for an improved oil-water separation porous structure and a manufacturing method thereof to solve the aforementioned problems met in the art.

SUMMARY

In view of the problem in the art, the present disclosure provides a novel oil-water separation porous structure and a manufacturing method thereof, and an oil-water separation device containing the oil-water separation porous structure has higher oil-water separation efficiency, so that the generation of secondary pollutants may be avoided and the cost effectiveness may be increased.

An embodiment of the present disclosure is provided an oil-water separation porous structure including a carrier board and an oil-water separation material layer.

The carrier board has a plurality of pores. The oil-water separation material layer is disposed on a surface of the carrier board, including a zwitterionic compound, and the zwitterionic compound including at least one hydroxysilane group and at least one zwitterionic group.

According to various embodiments of the present disclosure, a material of the carrier board includes metal and glass.

According to various embodiments of the present disclosure, the metal includes stainless steel, titanium, iron, copper or a combination thereof.

According to various embodiments of the present disclosure, the carrier board is a mesh structure woven by a plurality of metal wires or glass fibers.

According to various embodiments of the present disclosure, a density of pores of the carrier board is in a range of 300-1,000 mesh.

According to various embodiments of the present disclosure, a pore size of the carrier board is in a range of 0.1-200 μm.

According to various embodiments of the present disclosure, the hydroxysilane group of the zwitterionic compound in the oil-water separation material layer is formed a covalent bond with at least one hydroxyl group of the carrier board.

According to various embodiments of the present disclosure, the film adhesive layer further includes a stabilizer mixed with the film adhesive agent and the organic solvent.

According to various embodiments of the present disclosure, the zwitterionic group of the oil-water separation material layer includes a cationic group and an anionic group, wherein the cationic group includes primary amine, secondary amine, tertiary amine or quaternary ammonium, and the anionic group includes sulfite group ($-SO_3^-$), carboxylate group ($-COO^-$) or phosphodiester bond.

According to various embodiments of the present disclosure, the zwitterionic group has a structure of chemical formula I:

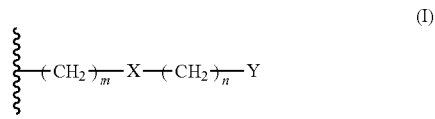

wherein X is ammonium

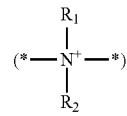

or phosphodiester bond

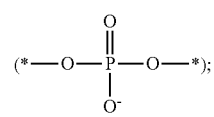

when X is quaternary ammonium or tertiary amine, Y is sulfite group ($-SO_3^-$), carboxylate group ($-COO^-$) or phosphodiester bond

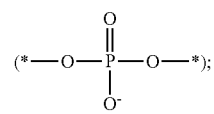

when X is phosphodiester bond, Y is primary amine, secondary amine, tertiary amine or quaternary ammonium

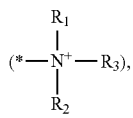

wherein $R_1$, $R_2$ and $R_3$ are individually hydrogen (H), methyl group (—$CH_3$), ethyl group (—$C_2H_5$) or propyl group (—$C_3H_7$), "*" denotes a position bonding to an adjacent group;

m and n are individually an integer of 1-5; and

"┤" denotes a position of the zwitterionic group bonding to the hydroxysilane group.

Another embodiment of the present disclosure is provided a method for manufacturing an oil-water separation porous structure. The method includes the following operations. An oil-water separation material, including a zwitterionic compound, is prepared, and the zwitterionic compound includes at least one hydroxysilane group and at least one zwitterionic group. An oil-water separation material layer is formed on a surface of a carrier substrate with the oil-water separation material, and the carrier board has a plurality of pores.

According to various embodiments of the present disclosure, the zwitterionic group of the oil-water separation material layer includes a cationic group and an anionic group, the cationic group includes primary amine, secondary amine, tertiary amine or quaternary ammonium, and the anionic group includes sulfite group (—$SO_3^-$), carboxylate group (—$COO^-$) or phosphodiester bond.

According to various embodiments of the present disclosure, the zwitterionic compound has a structure of chemical formula II:

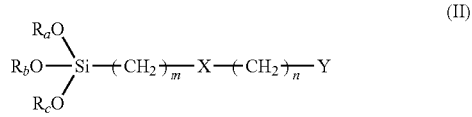

(II)

wherein X is ammonium

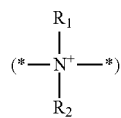

or phosphodiester bond

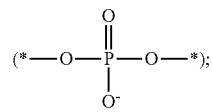

when X is quaternary ammonium or tertiary amine, Y is sulfite group (—$SO_3^-$), carboxylate group (—$COO^-$) or phosphodiester bond

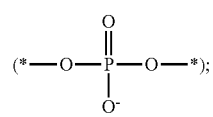

when X is phosphodiester bond, Y is primary amine, secondary amine, tertiary amine or quaternary ammonium

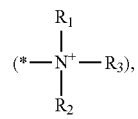

wherein $R_1$, $R_2$ and $R_3$ are individually hydrogen (H), methyl group (—$CH_3$), ethyl group (—$C_2H_5$) or propyl group (—$C_3H_7$), "*" denotes a position bonding to an adjacent group; $R_a$, $R_b$ and $R_c$ are individually hydrogen (H), methyl group (—$CH_3$) or ethyl group (—$C_2H_5$); and m and n are individually an integer of 1-5.

According to various embodiments of the present disclosure, the method further includes performing a condensation to make that the organosilane groups of the adjacent zwitterionic compounds are formed a polysiloxane structure.

According to various embodiments of the present disclosure, the operation of forming the oil-water separation material layer on a surface of a carrier substrate includes forming a covalent bond between the hydroxysilane group of the zwitterionic compound and at least one hydroxyl group of a surface of the carrier board.

According to various embodiments of the present disclosure, the method further includes performing an oxygen plasma process to form the hydroxyl group on the surface of the carrier board.

According to various embodiments of the present disclosure, the operation of forming the oil-water separation material layer on a surface of a carrier substrate further includes the following operations. A plurality of hydrogen bonds between the hydroxysilane group of the zwitterionic compound and the hydroxyl group of the carrier board are formed. A plurality of covalent bonds between the hydroxysilane group of the zwitterionic compound and the hydroxyl group of the carrier board are formed.

According to various embodiments of the present disclosure, a process for forming the covalent bonds between the hydroxysilane group of the zwitterionic compound and the hydroxyl group of the carrier board includes performing a thermal curing process to make the zwitterionic compound fixed on the surface of the carrier board.

Further another embodiment of the present disclosure is provided an oil-water separation device including a containing unit and the oil-water separation porous structure as mentioned above. The containing unit for containing an oil-water mixture to be separated has a top opening and a bottom opening opposite to the top opening. The oil-water separation porous structure is disposed under and covers the bottom opening of the containing unit.

According to various embodiments of the present disclosure, the oil-water separation device further includes a pressurized unit connecting and covering the top opening of the containing unit.

Further another embodiment of the present disclosure is provided an oil-water separation device including a containing unit, the oil-water separation porous structure as mentioned above and a pressurized unit. The containing unit for containing an oil-water mixture to be separated has a top opening and a bottom opening opposite to the top opening. The oil-water separation porous structure is disposed under and covers the top opening of the containing unit. The pressurized unit connects and covers the bottom opening of the containing unit.

It is to be understood that both the foregoing general description and the following detailed description are by examples, and are intended to provide further explanation of the present disclosure as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

The singular forms "a," "an" and "the" used herein include plural referents unless the context clearly dictates otherwise. Therefore, reference to, for example, a metal layer includes embodiments having two or more such metal layers, unless the context clearly indicates otherwise. Reference throughout this specification to "one embodiment" means that a particular feature, structure, or characteristic described in connection with the embodiment is included in at least one embodiment of the present disclosure. Therefore, the appearances of the phrases "in one embodiment" or "in an embodiment" in various places throughout this specification are not necessarily all referring to the same embodiment. Further, the particular features, structures, or characteristics may be combined in any suitable manner in one or more embodiments. It should be appreciated that the following figures are not drawn to scale; rather, the figures are intended; rather, these figures are intended for illustration.

In view of the problem in the art, the present disclosure provides a novel oil-water separation porous structure and a manufacturing method thereof, and an oil-water separation device containing the oil-water separation porous structure. The oil-water separation porous structure includes an oil-water separation material layer having zwitterionic group, which may be used to efficiently separate a hydrophilic liquid and a lipophilic liquid mixed in an oil-water mixture, and has higher oil-water separation efficiency, so that the generation of secondary pollutants may be avoided and the cost effectiveness may be increased.

Figure 1:
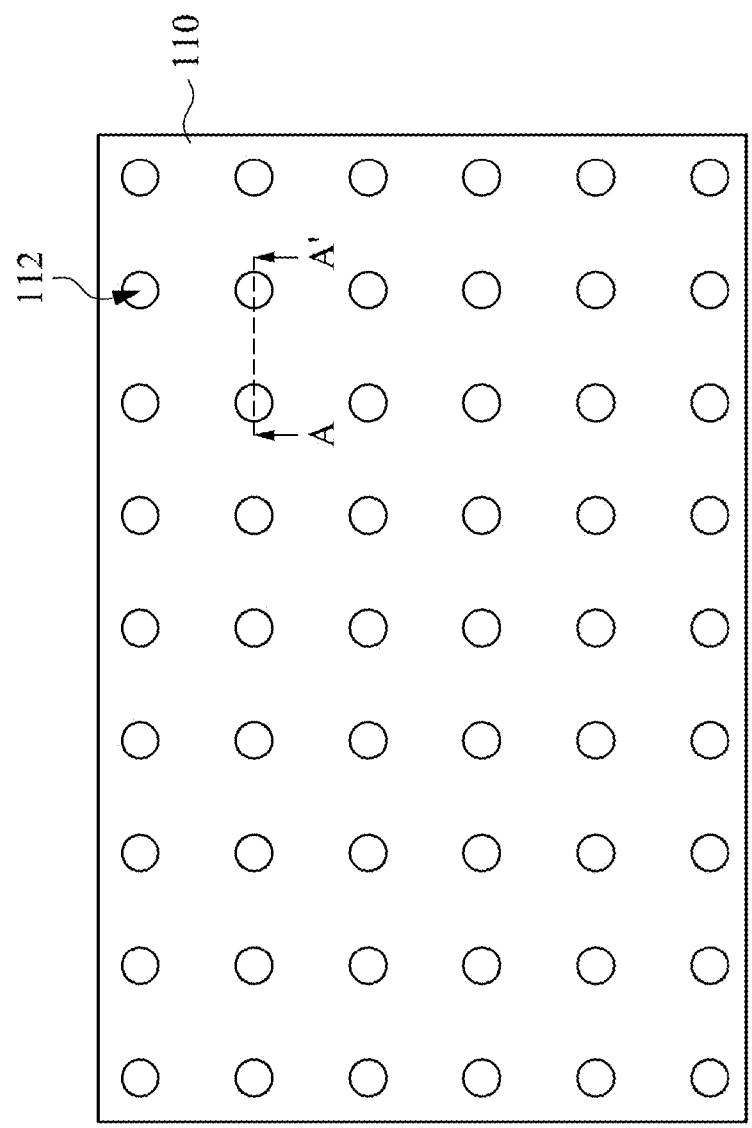
FIG. 1 is a top view of an oil-water separation porous structure 100 according to various embodiments of the present disclosure.

FIG. 1 is a top view of an oil-water separation porous structure 100 according to various embodiments of the present disclosure. In FIG. 1, the oil-water separation porous structure 100 includes a carrier board 110 and an oil-water separation material layer (not shown). The carrier board 110 has a plurality of pores 112. The oil-water separation material layer is disposed on a surface of the carrier board 110. According to various embodiments of the present disclosure, a material of the carrier board 110 includes metal and glass. According to various embodiments of the present disclosure, the metal includes stainless steel, titanium, iron, copper or a combination thereof. According to various embodiments of the present disclosure, a density of pores 112 of the carrier board 110 is in a range of 300-1,000 mesh. According to various embodiments of the present disclosure, a pore size of the carrier board 110 is in a range of 0.1-200 μm.

Figure 2:
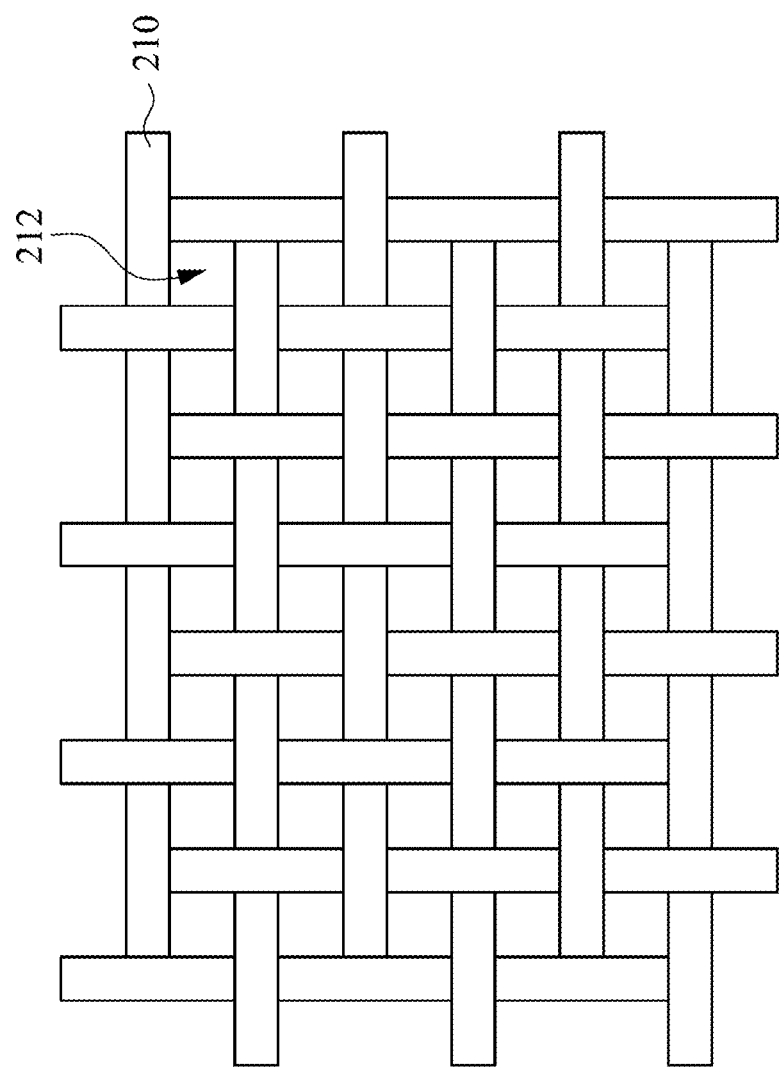
FIG. 2 is a top view of an oil-water separation porous structure 200 according to various embodiments of the present disclosure.

FIG. 2 is a top view of an oil-water separation porous structure 200 according to various embodiments of the present disclosure. In FIG. 2, the oil-water separation porous structure 200 includes a carrier board 210 and an oil-water separation material layer (not shown). The carrier board 210 has a plurality of pores 212. The oil-water separation material layer is disposed on a surface of the carrier board 210. According to various embodiments of the present disclosure, a material of the carrier board 210 includes metal and glass. According to various embodiments of the present disclosure, the metal includes stainless steel, titanium, iron, copper or a combination thereof. In FIG. 2, the carrier board 210 is a mesh structure woven by a plurality of metal wires or glass fibers. According to various embodiments of the present disclosure, a density of pores 212 of the carrier board 210 is in a range of 300-1,000 mesh. According to various embodiments of the present disclosure, a pore size of the carrier board 210 is in a range of 1-200 μm.

Figure 3:
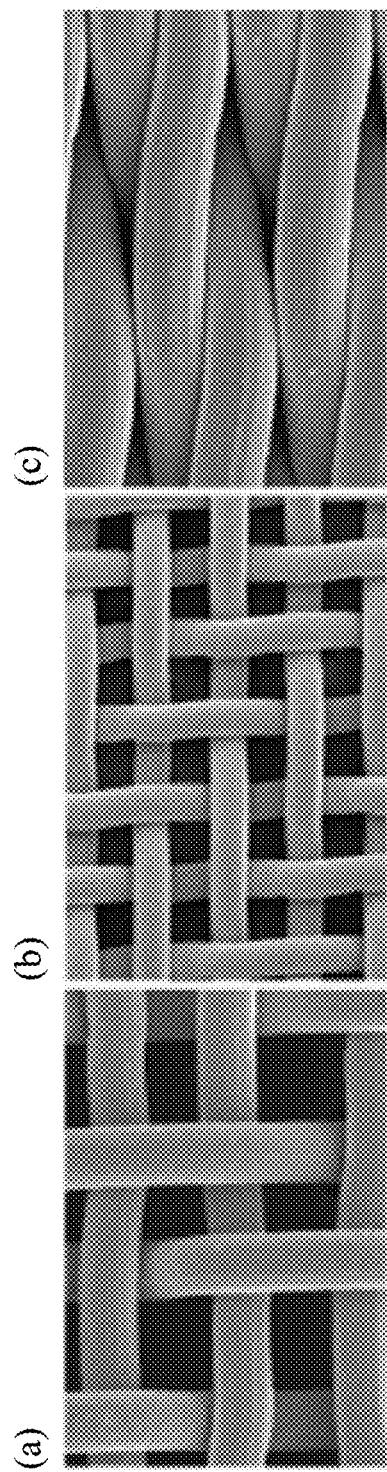
FIG. 3, including (a), (b) and (c), is several partial microscope images of oil-water separation porous structures according to various embodiments of the present disclosure, in which densities of pores of oil-water separation porous structures in (a), (b) and (c) of FIG. 3 are individually 300, 500 and 1000 mesh.

FIG. 3, including (a), (b) and (c), is several partial microscope images of oil-water separation porous structures according to various embodiments of the present disclosure, in which the oil-water separation porous structures are mesh structures woven by a plurality of stainless steel wires. The densities of pores of oil-water separation porous structures in (a), (b) and (c) of FIG. 3 are individually 300, 500 and 1000 mesh. Besides, in (a), (b) and (c) of FIG. 3, the density of pores of the oil-water separation porous structure is larger, so that the pore size of the oil-water separation porous structures is smaller. According to various embodiments of the present disclosure, a pore size of the carrier board is in a range of 0.1-200 μm.

Figure 4:
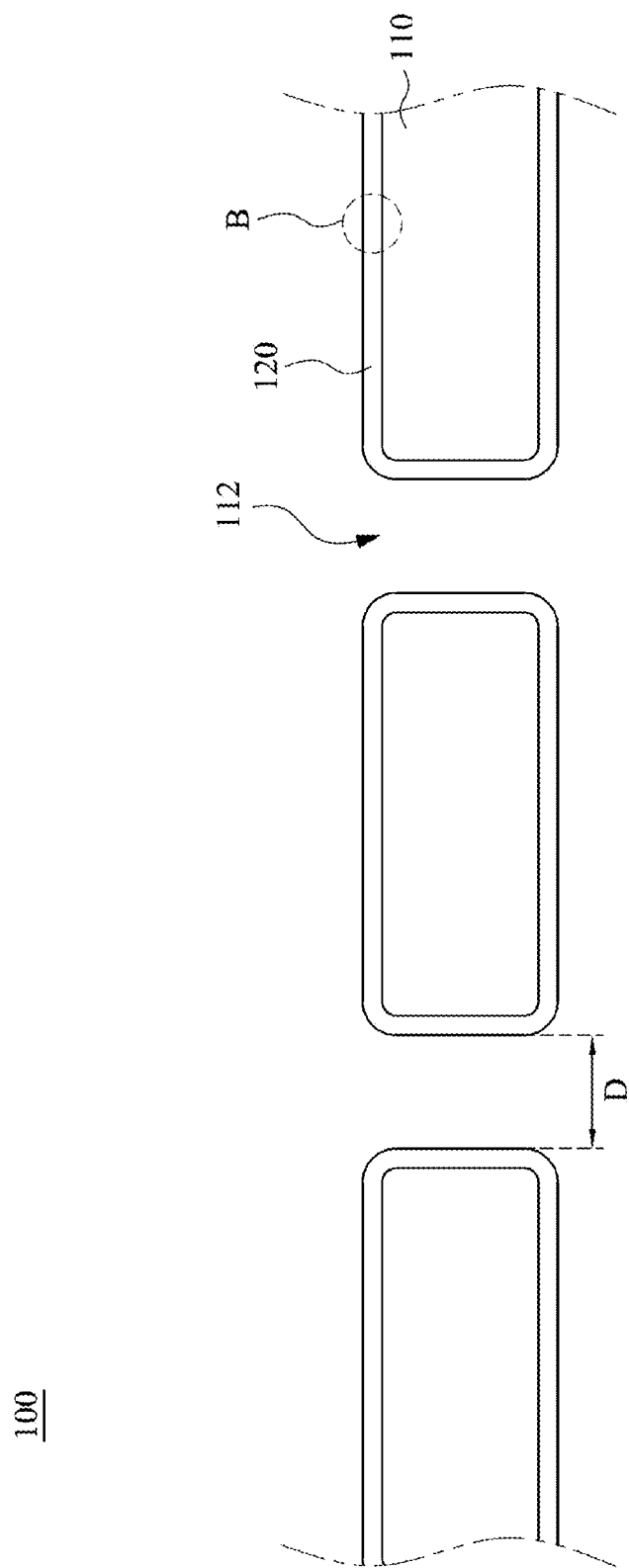
FIG. 4 is a schematic cross-sectional view of the oil-water separation porous structure 100 taken along A-A' line in FIG. 1.

FIG. 4 is a schematic cross-sectional view of the oil-water separation porous structure 100 taken along A-A' line in FIG. 1. In FIG. 4, the carrier board 110 has pores 112, and the oil-water separation material layer 120 is disposed on a surface of the carrier board 110. According to various embodiments of the present disclosure, a pore size (D) of the carrier board 110 is in a range of 1-200 μm.

Figure 5:
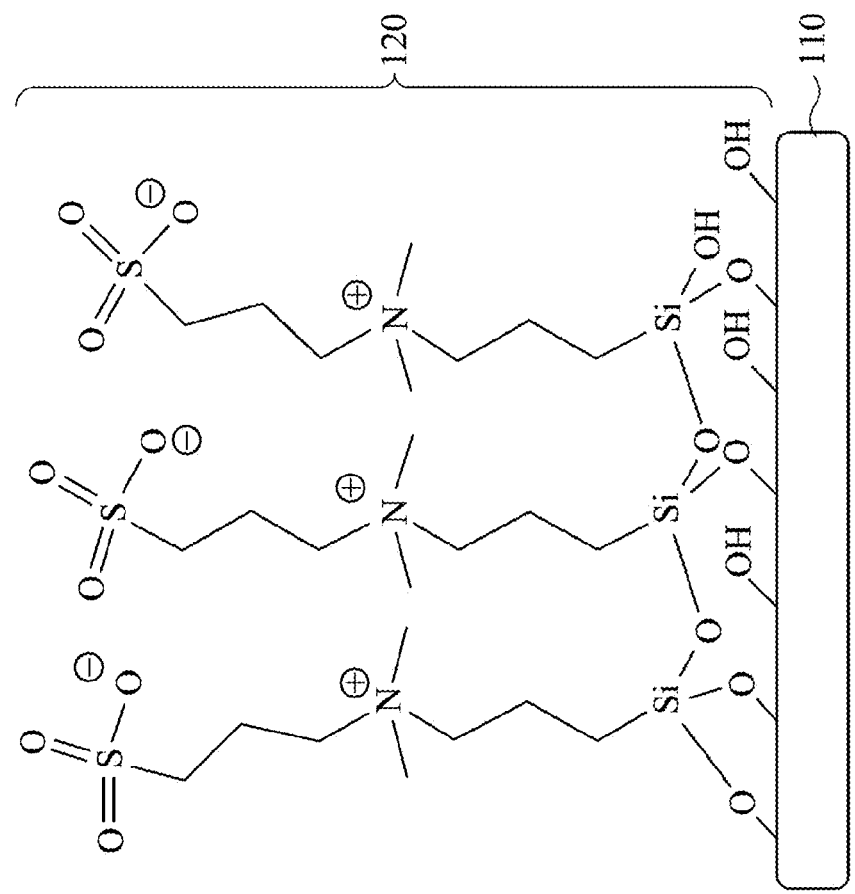
FIG. 5 is a partial enlarged view of the oil-water separation porous structure 100 according to area B in FIG. 4.

FIG. 5 is a partial enlarged view of the oil-water separation porous structure 100 according to area B in FIG. 4. In FIG. 5, the oil-water separation material layer 120 is disposed on a surface of the carrier board 110, and the oil-water separation material layer 120 includes a zwitterionic compound including at least one hydroxysilane group and at least one zwitterionic group.

According to various embodiments of the present disclosure, the zwitterionic group of the oil-water separation material layer includes a cationic group and an anionic group. According to various embodiments of the present disclosure, the cationic group includes primary amine, secondary amine, tertiary amine or quaternary ammonium, and the anionic group includes sulfite group (—SO$_3^-$), carboxylate group (—COO$^-$) or phosphodiester bond.

According to various embodiments of the present disclosure, the zwitterionic group has a structure of chemical formula I:

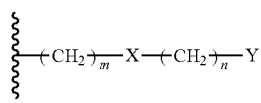

(I)

wherein X is ammonium

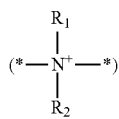

or phosphodiester bond

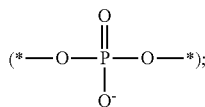

when X is quaternary ammonium or tertiary amine, Y is sulfite group (—SO$_3^-$), carboxylate group (—COO$^-$) or phosphodiester bond

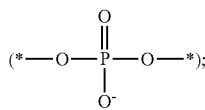

when X is phosphodiester bond, Y is primary amine, secondary amine, tertiary amine or quaternary ammonium

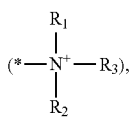

wherein R$_1$, R$_2$ and R$_3$ are individually hydrogen (H), methyl group (—CH$_3$), ethyl group (—C$_2$H$_5$) or propyl group (—C$_3$H$_7$), "*" denotes a position bonding to an adjacent group; m and n are individually an integer of 1-5; and "꜀" denotes a position of the zwitterionic group bonding to the hydroxysilane group.

In FIG. 5, the zwitterionic group has a structure of chemical formula I:

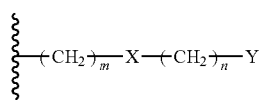

(I)

wherein X is quaternary ammonium

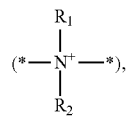

R$_1$ and R$_2$ are methyl group; Y is sulfite group (—SO$_3^-$); "*" denotes a position bonding to an adjacent group; m and n equals 3; and "꜀" denotes a position of the zwitterionic group bonding to the hydroxysilane group.

It's worthy noting that, the silane group of the zwitterionic compound in the oil-water separation material layer 120 is formed a covalent bond with at least one hydroxyl group of the carrier board 110. According to various embodiments of the present disclosure, the zwitterionic compound in the oil-water separation material layer 120 further includes a polysiloxane structure, and the polysiloxane structure is formed at least one covalent bond with a plurality of hydroxyl groups of the carrier board 110, as shown in FIG. 5.

According to various embodiments of the present disclosure, various oil-water mixtures are separated by the oil-water separation porous structure. The oil-water mixtures include an ether/water mixture, a toluene/water mixture, a hexane/water mixture, a gasoline/water mixture and diesel fuel/water mixture. Table 1 is comparison of the oil-water separation efficiencies of the oil-water mixtures by the oil-water separation porous structure provided by the present disclosure and a conventional porous structure without the oil-water separation material layer.

TABLE 1

| | Oil-water separation efficiencies (%) | |
|---|---|---|
| Oil-water mixtures | the oil-water separation porous structure provided by the present disclosure | a conventional porous structure without the oil-water separation material layer |
| ether/water mixture | 99.8 | 5 |
| toluene/water mixture | 99.8 | 3 |
| hexane/water mixture | 99.6 | 5 |
| gasoline/water mixture | 99.7 | 4 |
| diesel fuel/water mixture | 99.5 | 5 |

Note:
a density of a lipophilic liquid, such as ether, toluene, hexane, gasoline and diesel fuel, is less than that of water.

In Table 1, compared to the conventional porous structure without the oil-water separation material layer, the oil-water separation porous structure according to embodiments of the present disclosure has the significant oil-water separation efficiency. Because the conventional porous structure, as a control, has no oil-water separation material layer, the lipophilic liquid and the hydrophilic liquid in the oil-water mixture both pass through the conventional porous structure by gravity, so that the conventional porous structure can not have significant oil-water separation efficiency. In contrast, the hydrophilic liquid can pass through the oil-water separation porous structure according to embodiments of the present disclosure by gravity, but the lipophilic liquid can suspend and accumulate over the hydrophilic liquid by the polar repulsion of the oil-water separation material layer, so that the lipophilic liquid can not pass through the oil-water separation porous structure to provide the significant oil-water separation efficiency.

Figure 6:
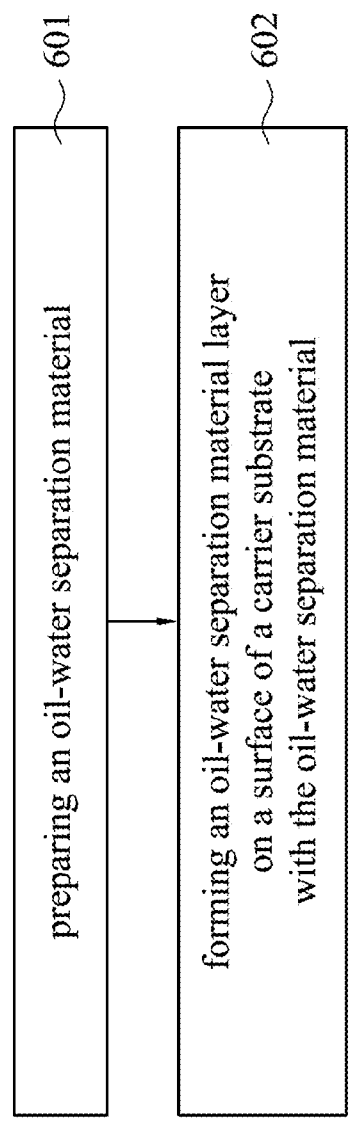
FIG. 6 is a flow chart illustrating a method for manufacturing an oil-water separation porous structure according various embodiments of the present disclosure.

FIG. 6 is a flow chart illustrating a method for manufacturing an oil-water separation porous structure according various embodiments of the present disclosure. In FIG. 6, the method for manufacturing the oil-water separation porous structure includes operations 601 and 602.

In operation 601, an oil-water separation material, including a zwitterionic compound, is prepared, and the zwitterionic compound includes at least one silane group and at least one zwitterionic group.

According to various embodiments of the present disclosure, the zwitterionic group of the oil-water separation material includes a cationic group and an anionic group, the cationic group includes primary amine, secondary amine, tertiary amine or quaternary ammonium, and the anionic group includes sulfite group ($-SO_3^-$), carboxylate group ($-COO^-$) or phosphodiester bond.

According to various embodiments of the present disclosure, the zwitterionic compound has a structure of chemical formula II:

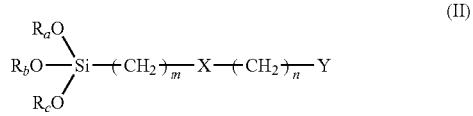

(II)

wherein X is ammonium

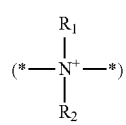

or phosphodiester bond

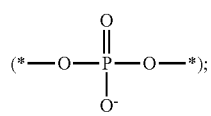

when X is ammonium, Y is sulfite group ($-SO_3^-$), carboxylate group ($-COO^-$) or phosphodiester bond

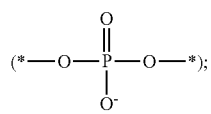

when X is phosphodiester bond, Y is primary amine, secondary amine, tertiary amine or quaternary ammonium

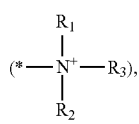

wherein $R_1$, $R_2$ and $R_3$ are individually hydrogen (H), methyl group ($-CH_3$), ethyl group ($-C_2H_5$) or propyl group ($-C_3H_7$), "*" denotes a position bonding to an adjacent group; $R_a$, $R_b$ and $R_c$ are individually hydrogen (H), methyl group ($-CH_3$) or ethyl group ($-C_2H_5$); and m and n are individually an integer of 1-5.

According to various embodiments of the present disclosure, the method for preparing the oil-water separation material is shown as scheme 1.

Scheme 1

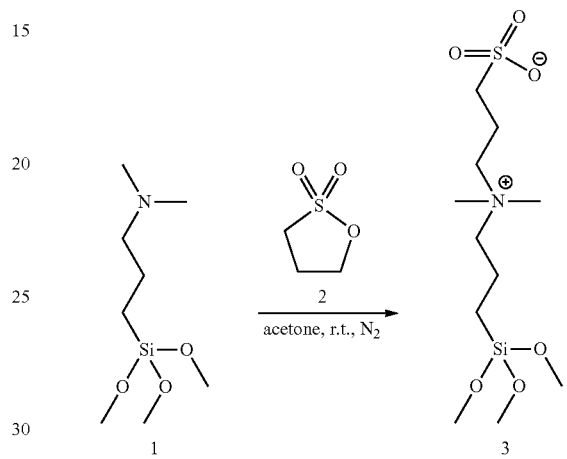

N,N-dimetylaminopropyl trimethoxyl silane (1) and 1,3-propanesultone (2) are both added in acetone and reacted under room temperature and nitrogen condition to give sulfobetaine silane (3, SBSi) having zwitterionic group. According to various embodiments of the present disclosure, the method further includes performing a condensation of the organosilane groups of the adjacent zwitterionic compounds to form a polysiloxane structure. According to various embodiments of the present disclosure, the condensation of the zwitterionic compound is shown as scheme 2.

Scheme 2

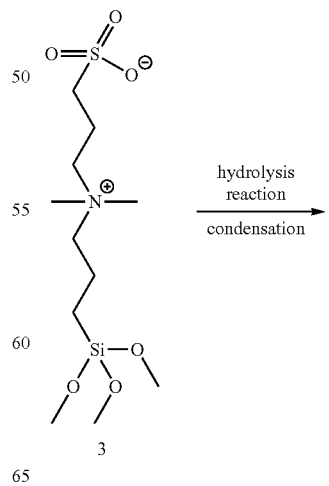

-continued

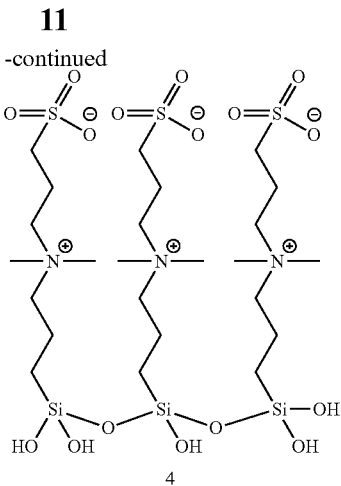

4

After the hydrolysis reaction and condensation of compound 3, a polymer 4 having polysiloxane structure is given.

In operation 602, an oil-water separation material layer is formed on a surface of a carrier substrate with the oil-water separation material, and the carrier board has a plurality of pores. According to various embodiments of the present disclosure, the operation of forming the oil-water separation material layer on a surface of a carrier substrate includes forming a covalent bond between the hydroxysilane group of the zwitterionic compound and at least one hydroxyl group of a surface of the carrier board.

Figure 7:
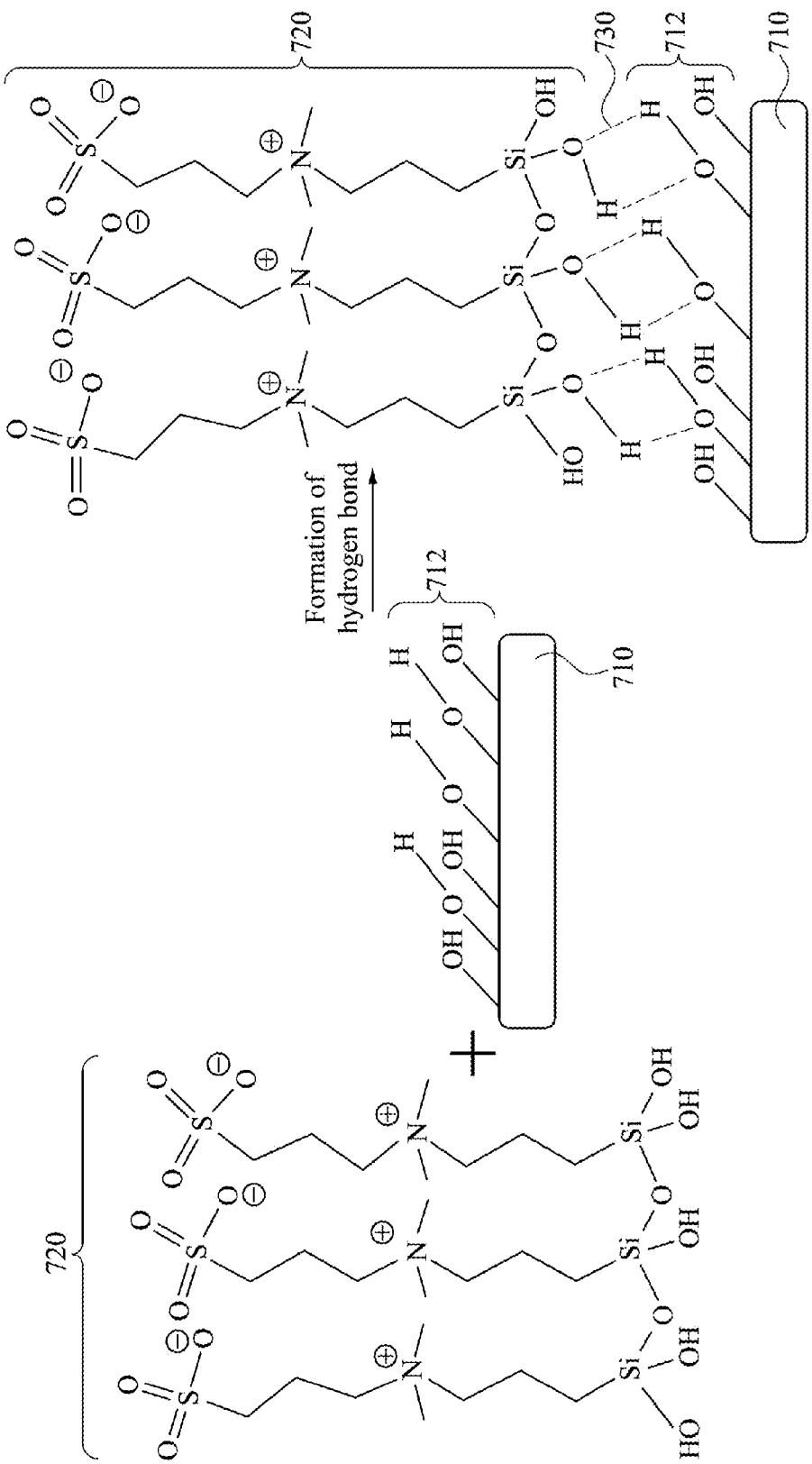
FIGS. 7-8 are schematic cross-sectional views at various stages of fabricating an oil-water separation porous structure according various embodiments of the present disclosure.
Figure 8:
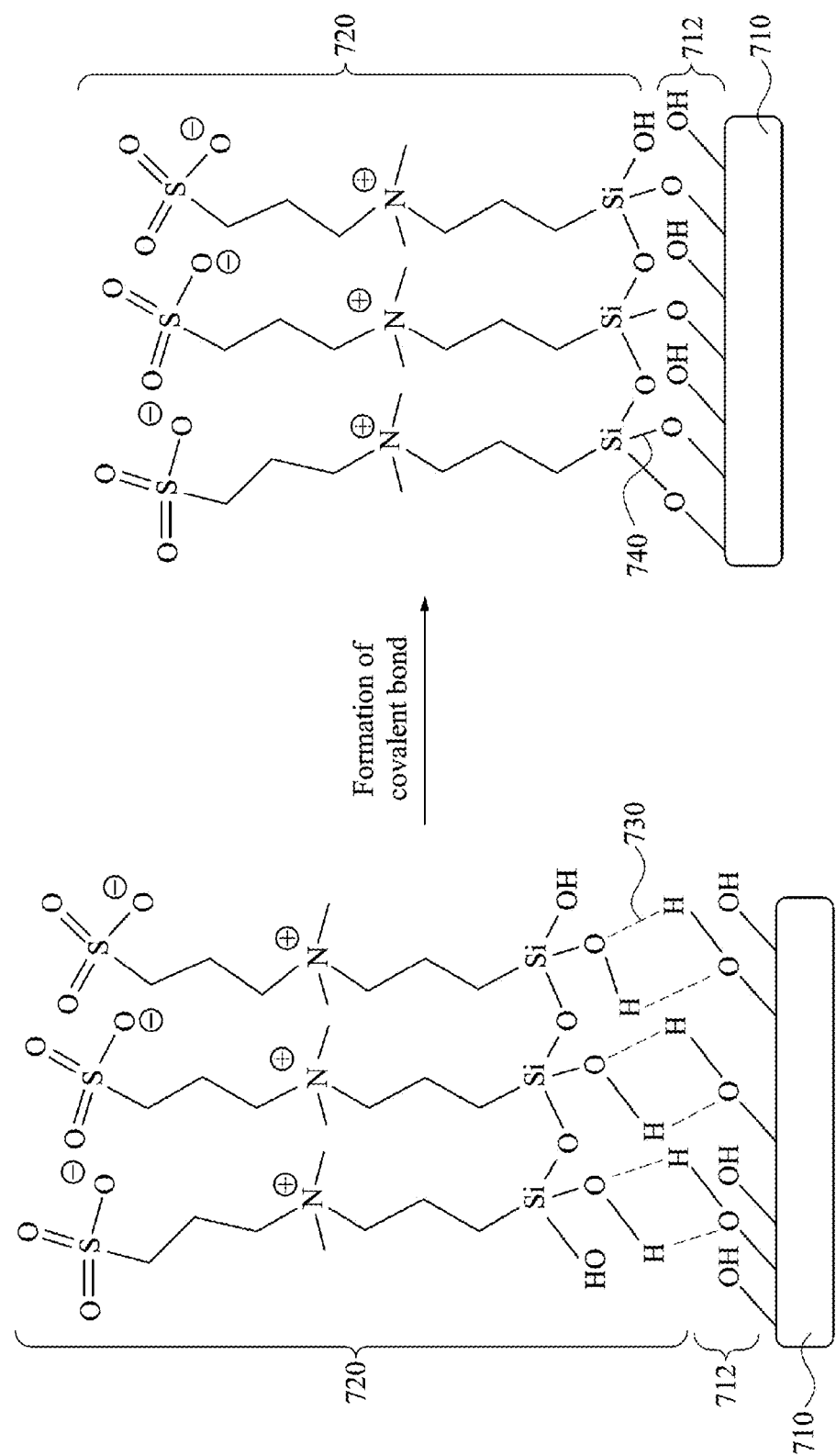

FIGS. 7-8 are schematic cross-sectional views at various stages of fabricating an oil-water separation porous structure according various embodiments of the present disclosure.

The operation of forming the oil-water separation material layer on a surface of a carrier substrate further includes the following operations. A plurality of hydrogen bonds between the hydroxysilane group of the zwitterionic compound and the hydroxyl group of the carrier board are formed, as shown in FIG. 7. A plurality of covalent bonds between the hydroxysilane group of the zwitterionic compound and the hydroxyl group of the carrier board are formed, as shown in FIG. 8.

In FIG. 7, a surface of the carrier board 710 having hydroxyl group 712 and the oil-water separation material 720 having zwitterionic group are formed hydrogen bonds. It is worthy noting that, the hydroxyl groups of the oil-water separation material 720 and thy hydroxyl group 712 of the surface of the carrier board 710 are formed hydrogen bonds 730, as shown in FIG. 7, right. According to various embodiments of the present disclosure, the method further includes performing an oxygen plasma process to form the hydroxyl group on the surface of the carrier board.

In FIG. 8, the hydrogen bonds 730 between the oil-water separation material 720 and carrier board 710 are formed covalent bonds by dehydration. Specifically, the hydroxyl groups of the oil-water separation material 720 and thy hydroxyl group 712 of the surface of the carrier board 710 are formed covalent bonds 740 by dehydration, as shown in FIG. 8, right. According to various embodiments of the present disclosure, a process for forming the covalent bonds between the hydroxysilane group of the zwitterionic compound and the hydroxyl group of the carrier board includes performing a thermal curing process to make the zwitterionic compound fixed on the surface of the carrier board.

Figure 9:
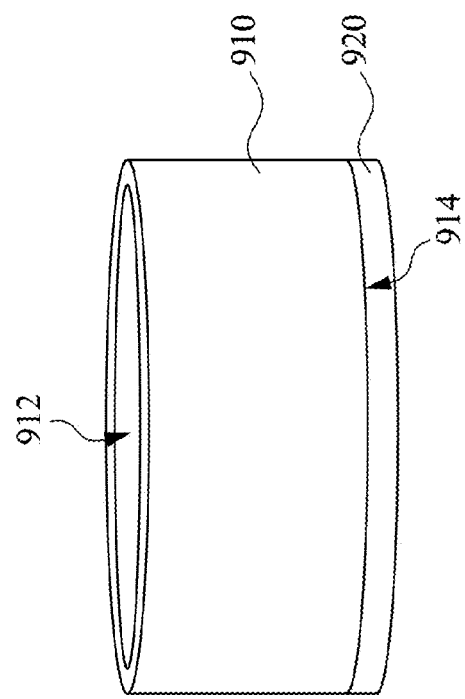
FIG. 9 is an oil-water separation device 900 according various embodiments of the present disclosure.

FIG. 9 is an oil-water separation device 900 according various embodiments of the present disclosure. In FIG. 9, the oil-water separation device 900 includes a containing unit 910 and the oil-water separation porous structure 920.

The containing unit 910 for containing an oil-water mixture to be separated has a top opening 912 and a bottom opening 914 opposite to the top opening 912. The oil-water separation porous structure 920 is disposed under and covers the bottom opening of the containing unit 910.

According to various embodiments of the present disclosure, when the density of the lipophilic liquid of the oil-water mixture to be separated is smaller than the density of hydrophilic liquid, the lipophilic liquid may suspend over the hydrophilic liquid, so that the hydrophilic solution may be passed through the oil-water separation porous structure and eluted by gravity while the oil-water separation porous structure positioning under and covering the bottom opening of the containing unit, so as to separate the lipophilic liquid and the hydrophilic liquid.

Figure 10:
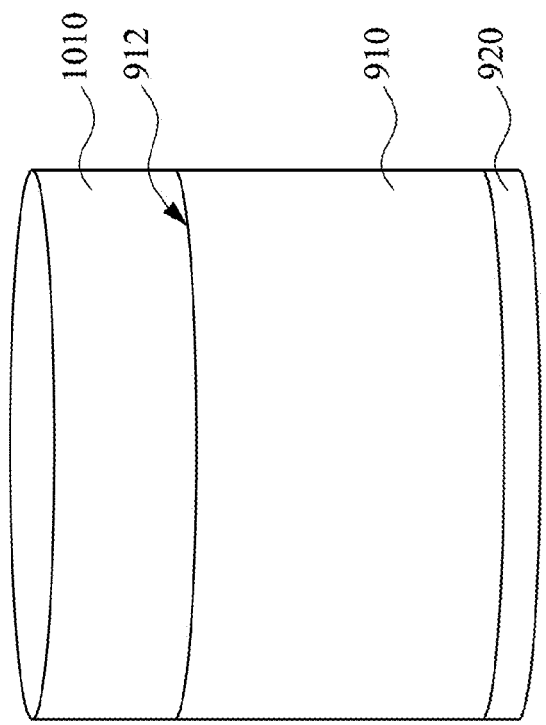
FIG. 10 is an oil-water separation device 1000 according various embodiments of the present disclosure.

FIG. 10 is an oil-water separation device 1000 according various embodiments of the present disclosure. In FIG. 10, the oil-water separation device 1000 includes the containing unit 910, the oil-water separation porous structure 920 and a pressurized unit 1010 connecting and covering the top opening 912 of the containing unit 910.

According to various embodiments of the present disclosure, the pore size of the oil-water separation porous structure is smaller, so the oil-water separation time is longer. In this condition, the pressurized unit is connected and covers the top opening of the containing unit, which makes that the hydrophilic liquid can be quickly passed through the oil-water separation porous structure, so as to reduce the oil-water separation time.

Figure 11:
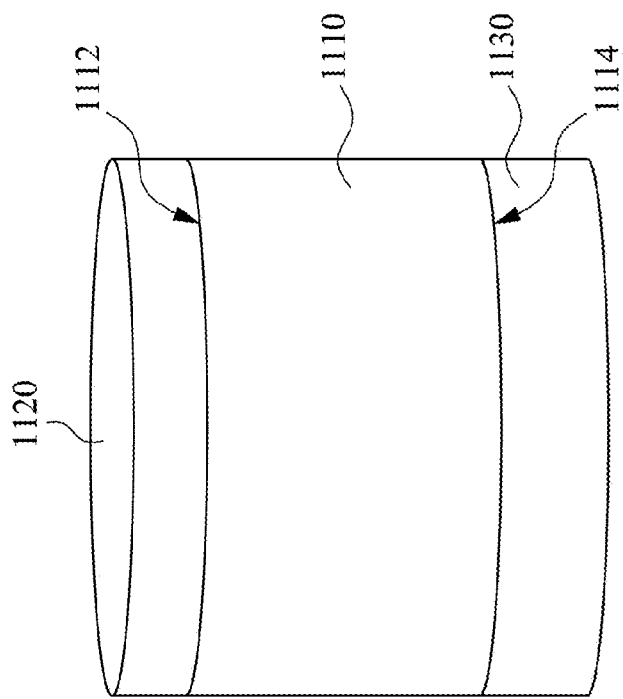
FIG. 11 is an oil-water separation device 1100 according various embodiments of the present disclosure.

FIG. 11 is an oil-water separation device 1100 according various embodiments of the present disclosure. In FIG. 11, the oil-water separation device 1000 includes a containing unit 110, an oil-water separation porous structure 1120 and a pressurized unit 1130.

The containing unit 1110 for containing an oil-water mixture to be separated has a top opening 1112 and a bottom opening 1114 opposite to the top opening 1112. The oil-water separation porous structure 1120 is disposed on and covers the top opening 1112 of the containing unit 1110. The pressurized unit 1130 is disposed under and covers the bottom opening 1114 of the containing unit 1110.

According to various embodiments of the present disclosure, when the density of the lipophilic liquid of the oil-water mixture to be separated is larger than the density of hydrophilic liquid, the lipophilic liquid may precipitate under the hydrophilic liquid, so that the hydrophilic liquid may be passed through the oil-water separation porous structure and eluted by a pressure provided by the pressurized unit to separate the lipophilic liquid and the hydrophilic liquid.

According to various embodiments of the present disclosure, the pore size of the oil-water separation porous structure is smaller, so the oil-water separation time is longer. In this condition, the pressurized unit is connected and disposed under the bottom opening of the containing unit, which makes that the hydrophilic liquid can be quickly passed through the oil-water separation porous structure, so as to reduce the oil-water separation time.

The oil-water separation porous structure includes an oil-water separation material layer having zwitterionic group, which may be used to efficiently separate a hydrophilic liquid and a lipophilic liquid mixed in an oil-water mixture, and has higher oil-water separation efficiency, so that the generation of secondary pollutants may be avoided and the cost effectiveness may be increased.

On another aspect, in accordance with embodiments of the present disclosure, the position of the oil-water separation porous structure of the oil-water separation device may be adjusted according to the difference of the densities of the lipophilic liquid and the hydrophilic liquid in the oil-water mixture. A pressurized unit may be connected and positioned in need, so as to separate the lipophilic liquid and the hydrophilic liquid.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the present disclosure. In view of the foregoing, it is intended that the present disclosure cover modifications and variations of the present disclosure provided they fall within the scope of the following claims.

What is claimed is:

1. An oil-water separation porous structure, comprising:
a carrier board having a plurality of pores; and
an oil-water separation material layer disposed on a surface of the carrier board, comprising a zwitterionic compound, and the zwitterionic compound comprising at least one hydroxysilane group and at least one zwitterionic group.

2. The oil-water separation porous structure of claim 1, wherein a material of the carrier board comprises metal and glass.

3. The oil-water separation porous structure of claim 2, wherein the metal comprises stainless steel, titanium, iron, copper or a combination thereof.

4. The oil-water separation porous structure of claim 2, wherein the carrier board is a mesh structure woven by a plurality of metal wires or glass fibers.

5. The oil-water separation porous structure of claim 1, wherein a density of pores of the carrier board is in a range of 300-1,000 mesh.

6. The oil-water separation porous structure of claim 1, wherein a pore size of the carrier board is in a range of 0.1-200 μm.

7. The oil-water separation porous structure of claim 1, wherein the hydroxysilane group of the zwitterionic compound in the oil-water separation material layer is formed a covalent bond with at least one hydroxyl group of the carrier board.

8. The oil-water separation porous structure of claim 1, wherein the zwitterionic compound further comprises a polysiloxane structure, and the polysiloxane structure is formed at least one covalent bond with the carrier board.

9. The oil-water separation porous structure of claim 1, wherein the zwitterionic group of the oil-water separation material layer comprising a cationic group and an anionic group, wherein the cationic group comprises primary amine, secondary amine, tertiary amine or quaternary ammonium, and the anionic group comprises sulfite group (—$SO_3^-$), carboxylate group (—$COO^-$) or phosphodiester bond.

10. The oil-water separation porous structure of claim 1, wherein the zwitterionic group has a structure of chemical formula I:

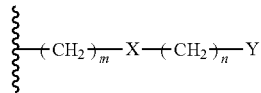
(I)

wherein X is ammonium

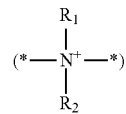

or phosphodiester bond

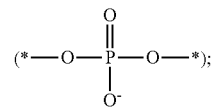

when X is quaternary ammonium or tertiary amine, Y is sulfite group (—$SO_3^-$), carboxylate group (—$COO^-$) or phosphodiester bond

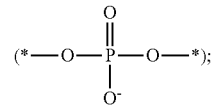

when X is phosphodiester bond, Y is primary amine, secondary amine, tertiary amine or quaternary ammonium

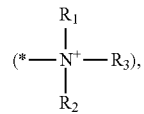

wherein $R_1$, $R_2$ and $R_3$ are individually hydrogen (H), methyl group (—$CH_3$), ethyl group (—$C_2H_5$) or propyl group (—$C_3H_7$), "*" denotes a position bonding to an adjacent group;
m and n are individually an integer of 1-5; and
" ⌇ " denotes a position of the zwitterionic group bonding to the hydroxysilane group.

11. An oil-water separation device, comprising:
a containing unit for containing an oil-water mixture to be separated, having a top opening and a bottom opening opposite to the top opening; and
the oil-water separation porous structure of claim 1 disposed under and covering the bottom opening of the containing unit.

12. The oil-water separation device of claim 11, further comprising a pressurized unit connecting and covering the top opening of the containing unit.

13. An oil-water separation device, comprising:
a containing unit for containing an oil-water mixture to be separated, having a top opening and a bottom opening opposite to the top opening;

the oil-water separation porous structure of claim 1 disposed under and covering the top opening of the containing unit; and a pressurized unit connecting and covering the bottom opening of the containing unit.

14. A method for manufacturing an oil-water separation porous structure, comprising:

preparing an oil-water separation material comprising a zwitterionic compound, and the zwitterionic compound comprising at least one hydroxysilane group and at least one zwitterionic group; and forming an oil-water separation material layer on a surface of a carrier substrate with the oil-water separation material, the carrier substrate having a plurality of pores.

15. The method of claim 14, wherein the zwitterionic group of the oil-water separation material comprises a cationic group and an anionic group, the cationic group comprises primary amine, secondary amine, tertiary amine or quaternary ammonium, and the anionic group comprises sulfite group (—$SO_3^-$), carboxylate group (—$COO^-$) or phosphodiester bond.

16. The method of claim 15, wherein the zwitterionic compound has a structure of chemical formula II:

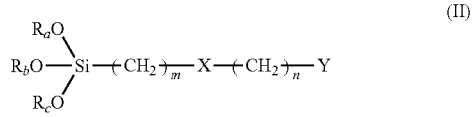

(II)

wherein X is ammonium

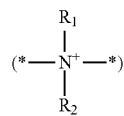

or phosphodiester bond

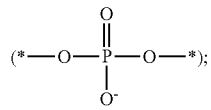

when X is quaternary ammonium and tertiary amine, Y is sulfite group (—$SO_3^-$), carboxylate group (—$COO^-$) or phosphodiester bond

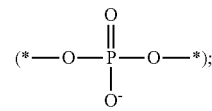

when X is phosphodiester bond, Y is primary amine, secondary amine, tertiary amine or quaternary ammonium

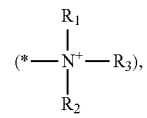

wherein $R_1$, $R_2$ and $R_3$ are individually hydrogen (H), methyl group (—$CH_3$), ethyl group (—$C_2H_5$) or propyl group (—$C_3H_7$), "*" denotes a position bonding to an adjacent group;

$R_a$, $R_b$ and $R_c$ are individually hydrogen (H), methyl group (—$CH_3$) or ethyl group (—$C_2H_5$); and m and n are individually an integer of 1-5.

17. The method of claim 16, further comprising performing a condensation to make that the organosilane groups of the adjacent zwitterionic compounds are formed a polysiloxane structure.

18. The method of claim 14, wherein forming the oil-water separation material layer on a surface of a carrier substrate comprises forming a covalent bond between the hydroxysilane group of the zwitterionic compound and at least one hydroxyl group of a surface of the carrier substrate.

19. The method of claim 18, further comprising performing an oxygen plasma process to form the hydroxyl group on the surface of the carrier substrate.

20. The method of claim 18, wherein forming the oil-water separation material layer on a surface of a carrier substrate further comprises:

forming a plurality of hydrogen bonds between the hydroxysilane group of the zwitterionic compound and the hydroxyl group of the carrier substrate; and forming a plurality of covalent bonds between the hydroxysilane group of the zwitterionic compound and the hydroxyl group of the carrier substrate.

21. The method of claim 20, wherein a process for forming the covalent bonds between the hydroxysilane group of the zwitterionic compound and the hydroxyl group of the carrier substrate comprises performing a thermal curing process to make the zwitterionic compound fixed on the surface of the carrier substrate.

* * * * *